United States Patent
Stojanovski et al.

(10) Patent No.: US 9,288,756 B2
(45) Date of Patent: Mar. 15, 2016

(54) SYSTEMS AND METHODS FOR DEVICE-TO-DEVICE COMMUNICATION IN THE ABSENCE OF NETWORK COVERAGE

(71) Applicant: Intel Corporation, Santa Clara, CA (US)

(72) Inventors: Alexandre Saso Stojanovski, Paris (FR); Achim Luft, Braunschweig (DE); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 13/930,669

(22) Filed: Jun. 28, 2013

(65) Prior Publication Data

US 2014/0094119 A1    Apr. 3, 2014

Related U.S. Application Data

(60) Provisional application No. 61/707,784, filed on Sep. 28, 2012.

(51) Int. Cl.
*H04W 84/22* (2009.01)
*H04W 52/02* (2009.01)
(Continued)

(52) U.S. Cl.
CPC ............ *H04W 52/0209* (2013.01); *H04B 5/00* (2013.01); *H04J 3/1694* (2013.01);
(Continued)

(58) Field of Classification Search
CPC ....... H04W 84/22; H04W 8/00; H04W 8/186; H04W 8/22; H04W 92/24; H04B 5/0037; H04B 17/327; H04B 5/00; H04B 5/0056

USPC .......... 455/518, 519, 411, 410; 380/247, 229, 380/232
See application file for complete search history.

(56) References Cited

U.S. PATENT DOCUMENTS 7,461,253 B2 * 12/2008 Braskich et al. .............. 713/169
8,976,954 B1 *  3/2015 Williams et al. ......... 379/265.06
(Continued)

FOREIGN PATENT DOCUMENTS

JP    2012100304 A    5/2012
JP    2012175641 A    9/2012
(Continued)

OTHER PUBLICATIONS

U.S. Appl. No. 14/125,706, Preliminary Amendment filed Dec. 12, 2013, 14 pgs.
(Continued)

*Primary Examiner* — Minh D Dao
(74) *Attorney, Agent, or Firm* — Schwegman Lundberg & Woessner, P.A.

(57) ABSTRACT

A method and system for establishing a secure device-to-device connection between two mobile devices involves the use of a WiFi Direct (LTE Direct or other similar protocols) link paired with an IP Multimedia Subsystems (IMS) link. A device detects the presence of another device that it wishes to connect to. The devices negotiate a group owner, then authenticate each other using a variety of techniques, such as a centrally issued certificate. Thereafter, the devices derive keys to be used for communication, both over the WiFi Direct link and via the IMS link. A WiFi Direct Link may be paired with a Push to Talk over Cellular (PoC) link in order to couple together more than two devices. In such a connection, devices transmit to a group owner, which then sends multicast versions to the rest of the group devices.

24 Claims, 6 Drawing Sheets

(51) Int. Cl.

| | | |
|---|---|---|
| H04W 24/10 | (2009.01) | |
| H04W 48/14 | (2009.01) | |
| H04L 5/00 | (2006.01) | |
| H04W 52/14 | (2009.01) | |
| H04W 72/04 | (2009.01) | |
| H04B 5/00 | (2006.01) | |
| H04J 3/16 | (2006.01) | |
| H04L 5/14 | (2006.01) | |
| H04L 29/06 | (2006.01) | |
| H04L 29/08 | (2006.01) | |
| H04W 24/08 | (2009.01) | |
| H04W 28/08 | (2009.01) | |
| H04W 36/22 | (2009.01) | |
| H04W 40/24 | (2009.01) | |
| H04W 48/16 | (2009.01) | |
| H04W 48/20 | (2009.01) | |
| H04W 72/02 | (2009.01) | |
| H04W 76/02 | (2009.01) | |
| H04W 4/00 | (2009.01) | |
| H04W 8/08 | (2009.01) | |
| H04W 36/00 | (2009.01) | |
| H04W 88/02 | (2009.01) | |
| H04W 76/04 | (2009.01) | |
| H04W 36/08 | (2009.01) | |
| H04W 48/18 | (2009.01) | |

(52) U.S. Cl.
CPC ........... *H04L 5/0055* (2013.01); *H04L 5/0057* (2013.01); *H04L 5/0073* (2013.01); *H04L 5/14* (2013.01); *H04L 65/60* (2013.01); *H04L 65/602* (2013.01); *H04L 67/10* (2013.01); *H04W 4/005* (2013.01); *H04W 8/08* (2013.01); *H04W 24/08* (2013.01); *H04W 24/10* (2013.01); *H04W 28/08* (2013.01); *H04W 36/0083* (2013.01); *H04W 36/22* (2013.01); *H04W 40/246* (2013.01); *H04W 48/14* (2013.01); *H04W 48/16* (2013.01); *H04W 48/20* (2013.01); *H04W 52/0212* (2013.01); *H04W 52/14* (2013.01); *H04W 72/02* (2013.01); *H04W 72/042* (2013.01); *H04W 72/0406* (2013.01); *H04W 72/0413* (2013.01); *H04W 72/0486* (2013.01); *H04W 76/022* (2013.01); *H04W 76/025* (2013.01); *H04W 76/046* (2013.01); *H04W 88/02* (2013.01); *H04W 36/08* (2013.01); *H04W 48/18* (2013.01); *H04W 52/0261* (2013.01); *Y02B 60/50* (2013.01)

(56) References Cited

U.S. PATENT DOCUMENTS

| | | | |
|---|---|---|---|
| 2002/0184373 A1* | 12/2002 | Maes ........................... | 709/228 |
| 2006/0031378 A1 | 2/2006 | Vallapureddy et al. | |
| 2007/0003062 A1* | 1/2007 | Mizikovsky et al. ......... | 380/270 |
| 2007/0109989 A1 | 5/2007 | Nakagawa et al. | |
| 2008/0005568 A1* | 1/2008 | Watson et al. ................ | 713/176 |
| 2009/0181670 A1 | 7/2009 | Tseng | |
| 2010/0110896 A1 | 5/2010 | Tseng et al. | |
| 2010/0110897 A1 | 5/2010 | Chun et al. | |
| 2010/0272018 A1 | 10/2010 | Furueda et al. | |
| 2011/0078438 A1* | 3/2011 | Tie et al. ....................... | 713/155 |
| 2011/0086652 A1 | 4/2011 | So et al. | |
| 2011/0116415 A1 | 5/2011 | Naito et al. | |
| 2011/0201275 A1 | 8/2011 | Jabara et al. | |
| 2011/0271334 A1 | 11/2011 | Yang et al. | |
| 2011/0292912 A1 | 12/2011 | Zembutsu et al. | |
| 2012/0144226 A1 | 6/2012 | Yang et al. | |
| 2013/0024684 A1* | 1/2013 | Chunduri et al. ............. | 713/151 |

FOREIGN PATENT DOCUMENTS

| | | |
|---|---|---|
| KR | 1020110111234 A | 10/2011 |
| WO | WO-2011055999 A2 | 5/2011 |
| WO | WO-2011136321 A1 | 11/2011 |
| WO | WO-2012094151 A2 | 7/2012 |
| WO | WO-2012109542 A1 | 8/2012 |
| WO | WO-2014052303 A1 | 4/2014 |
| WO | WO-2014052730 A1 | 4/2014 |
| WO | WO-2014052774 A1 | 4/2014 |
| WO | WO-2014052877 A1 | 4/2014 |
| WO | WO-2014052905 A1 | 4/2014 |

OTHER PUBLICATIONS

U.S. Appl. No. 14/125,749, Preliminary Amendment filed Dec. 12, 2013, 8 pgs.
U.S. Appl. No. 14/126,252, Preliminary Amendment filed Dec. 13, 2013, 5 pgs.
U.S. Appl. No. 14/127,830, Preliminary Amendment filed Dec. 19, 2013, 12 pgs.
European Application Serial No. 13841346.3, Amendment filed Mar. 16, 2015, 18 pgs.
"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.
"Evolved Universal Terrestrial Radio Access (E-UTRA); User Equipment (UE) procedures in idle mode", 3GPP TS 36.304 V11.1.0. Technical Specification Group Radio Access Network. (Release 11)., (Sep. 2012), 33 pgs.
"HARQ-ACK PUCCH Resources in Response to ePDCCH Detections", R1-122259, 3GPP TSG RAN WG1 #69. Prague, Czech Republic. Samsung., (May 21, 2012), 2 pgs.
"HARQ-ACK Transmission in Response to E-PDCCH Detection", R1-120193, 3GPP TSG RAN WG1 #68. Samsung., (Feb. 2012), 3 pgs.
International Application Serial No. PCT/US2013/061379, International Preliminary Report on Patentability mailed Apr. 9, 2015, 9 pgs.
International Application Serial No. PCT/US2013/061379, International Search Report mailed Jan. 2, 2014, 3 pgs.
International Application Serial No. PCT/US2013/061379, Written Opinion mailed Jan. 2, 2014, 7 pgs.
International Application Serial No. PCT/US2013/062132, International Preliminary Report on Patentability mailed Apr. 9, 2015, 8 pgs.
International Application Serial No. PCT/US2013/062132, International Search Report mailed Jan. 28, 2014, 3 pgs.
International Application Serial No. PCT/US2013/062132, Written Opinion mailed Jan. 28, 2014, 6 pgs.
International Application Serial No. PCT/US2013/062210, International Preliminary Report on Patentability mailed Apr. 9, 2015, 15 pgs.
International Application Serial No. PCT/US2013/062210, International Search Report mailed Feb. 28, 2014, 4 pgs.
International Application Serial No. PCT/US2013/062210, Invitation to Pay Additional Fees and Partial Search Report mailed Dec. 16, 2013, 7 pgs.
International Application Serial No. PCT/US2013/062210, Written Opinion mailed Feb. 28, 2014, 13 pgs.
International Application Serial No. PCT/US2013/062379, International Preliminary Report on Patentability mailed Apr. 9, 2015, 9 pgs.
International Application Serial No. PCT/US2013/062379, International Search Report mailed Jan. 6, 2014, 6 pgs.
International Application Serial No. PCT/US2013/062379, Written Opinion mailed Jan. 6, 2014, 7 pgs.
International Application Serial No. PCT/US2013/062427, International Preliminary Report on Patentability mailed Apr. 9, 2015, 8 pgs.
International Application Serial No. PCT/US2013/062427, International Search Report mailed Jan. 6, 2014, 3 pgs.
International Application Serial No. PCT/US2013/062427, Written Opinion mailed Jan. 6, 2014, 6 pgs.

(56) References Cited

OTHER PUBLICATIONS

Korean Application Serial No. 10-2015-7005286, Amendment filed Feb. 27, 2015, W/ English Agent's Note on Amendments, 5 pgs.
"PUCCH Resource Allocation Corresponding to ePDCCH", R1-120666, 3GPP TSG RAN WG1 Meeting #68. ASUSTEK., (Feb. 2012), 2 pgs.
"PUCCH resource allocation for E-PDCCH", R1-120329, 3GPP TSG RAN1 #68. Pantech., (Feb. 2012), 2 pgs.
"PUCCH resource for ePDCCH", R1-123266, 3GPP TSG RAN WG1 Meeting #70. Qingdao, China. Sharp., (Aug. 13, 2012), 8 pgs.
"PUCCH resource mapping with ePDCCH", R1-114066, 3GPP TSG RAN WG1 Meeting #67. Alcatel-Lucent Shanghai Bell, Alcatel-Lucent., (Nov. 2011), 2 pgs.
Hayashi, Toshiki, "Evolved Packet Core (EPC) Network Equipment for Long Term Evolution (LTE)", Fujitsu Sci. Tech. J., vol. 48, No. 1, (Jan. 2011), 17-20.

* cited by examiner

SYSTEMS AND METHODS FOR DEVICE-TO-DEVICE COMMUNICATION IN THE ABSENCE OF NETWORK COVERAGE

CROSS-REFERENCE TO RELATED APPLICATIONS

This application claims priority under 35 U.S.C. §119(e) to U.S. Provisional Patent Application Ser. No. 61/707,784, filed Sep. 28, 2012, which is incorporated herein by reference in its entirety.

TECHNICAL FIELD

Embodiments pertain to electronics. Some embodiments pertain to electronic communication products.

BACKGROUND ART

In typical communications settings, a cell phone or other type of mobile communication device communicates with other devices through the use of a network. In many situations, it would be desirable for a mobile communication device to communicate directly with one or more other mobile communication devices in a secure manner, with or without a network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DESCRIPTION OF THE EMBODIMENTS

Figure 1A:
FIGS. 1A and 1B present overviews of 1:1 communication and group communication.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of devices" may include two or more devices.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as technical specifications and technical reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption.

A study on the UTRA & UTRAN Long Term Evolution (UTRAN-LTE, also known as 3GPP-LTE and E-UTRA) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies. 3GPP-LTE is based on a radio-interface incorporating orthogonal frequency division multiplex (OFDM) techniques. OFDM is a digital multi-carrier modulation format that uses a large number of closely spaced orthogonal sub-carriers to carry respective user data channels. Each sub-carrier is modulated with a conventional modulation scheme, such as quadrature amplitude modulation (QAM), at a (relatively) low symbol rate when compared to the radio frequency (RF) transmission rate. In practice, OFDM signals are generated using the Fast Fourier transform (FFT) algorithm.

In a traditional communication scenario, when a device, such as a user equipment ("UE"), communicates with another device or UE, the communication first travels through a network. For example, in a 3GPP-LTE network, such communications would travel from one UE, through an evolved Node B ("eNB"), to another UE. In a WiFi network, such communications may travel through an access point ("AP"). Proximity-based services ("ProSe"), also known as Device-to-Device communications (D2D), allow a device to communicate directly with another device, without the need for the communications to travel through a network. Such a service may be especially valuable in the case of an emergency that disables all or part of a network. Such an emergency may include natural disasters, widespread power outages, terrorist attacks, and the like. Such a service may be especially useful for first responders, e.g., police officers, firefighters, emergency medical technicians (EMTs), and the like. There are several proposals for setting up a separate 3GPP-Network for first responders, such as First Responder Network Authority (FirstNet). It should be understood, however, that this specification not so limited.

There are two basic types of ProSe communications: 1:1 ProSe communication and ProSe Group communication. With reference to FIG. 1A, an exemplary instance of 1:1 ProSe communication is illustrated. A device 102 and a device 104 are arranged to communicate directly with each other without any need to first direct the communications through a network via an eNB, an access point, a base station, or the like.

Figure 1B:
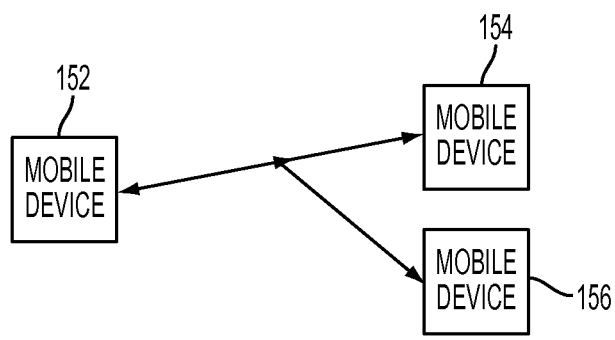

With reference to FIG. 1B, an exemplary instance of ProSe Group communication is illustrated. A device 152 is arranged to communicate directly with device 154 and device 156, without the need to first direct the communications through an eNB, base station, or other similar device. Similarly, though not illustrated in FIG. 1B, device 154 and device 156 may be able to communicate directly with each other without any need to first direct the communications through a network. It should be understood that there may be additional devices within the ProSe Group. However, such devices are not illustrated in FIG. 1B.

Referring again to FIG. 1A, there may be a situation where it is desired that device 102 and device 104 should be able to discover each other and engage in direct communication. The system should be able to authorize device 102 and 104 to establish data sessions via signaling with the network (if network coverage is available) or via configuration available in a Universal Subscriber Identity Module ("USIM") of each device (if network coverage is not available). □

Two candidate technologies for the D2D communication link are WiFi (e.g., WiFi Direct) or a new LTE-based technology, referred to herein as "LTE Direct". While portions of this specification may refer specifically to WiFi Direct, it should be understood that embodiments may also be used with LTE Direct and other D2D communication link technologies that either currently exist or may be developed in the future.

In WiFi Direct, the multicast channel on the D2D link is equivalent to multicast 802.11 link-layer communications as defined in 802.11 standards. For this purpose, the ProSe Group members would first join the same 802.11 basic service set (BSS). The receiving device should also be able to receive a ProSe Group communication transmission regardless whether or not the transmitting device has discovered the receiving device. Therefore, it is assumed here that the system architecture should provide a way to protect user plane data that is transmitted on the ProSe Group communication channel that allows the receiving device to decipher the data even before the receiving device has been discovered (i.e., before the receiving device has joined the ProSe Group at the D2D layer).

Figure 2:
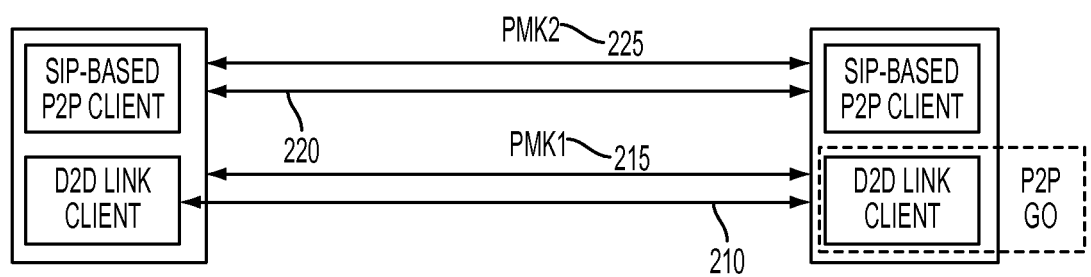
FIG. 2 presents an exemplary system architecture for 1:1 communication.

With reference to FIG. 2, an exemplary system architecture for 1:1 ProSe communication is presented. Here, device 202 and device 204 are coupled to each other via both a D2D link 210 and an application-layer communication session 220. The D2D link may be realized as a WiFi-Direct link. The communication session may be established using a SIP-based peer-to-peer (P2P) client at the application layer to establish and release P2P voice and data sessions.

Figure 3:
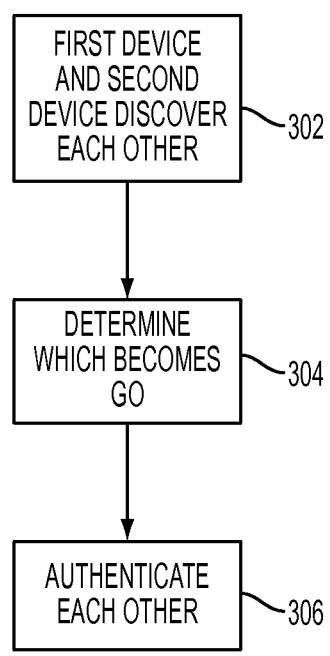
FIG. 3 is a flowchart illustrating the operation of an embodiment for 1:1 communication.

With reference to FIG. 3, an exemplary flowchart illustrating the establishment of a 1:1 communication session is presented. A first device and a second device discover each other using a variety of techniques either currently known in the art or developed in the future (302). Thereafter, the first device and the second device negotiate with each other to determine which station would become the Group Owner and which will become the client (304).

Communications via WiFi Direct is asymmetric in that one of the devices acts in a role similar to that of an 802.11 Access Point and is referred to as the P2P Group Owner ("GO"). The other device takes the role of a P2P Client. Referring again to FIG. 2, device 202 is the P2P client and device 204 is the P2P GO. The determination of which device becomes the P2P Client and which becomes the P2P GO may occur in one of several different ways that currently exist or may be developed in the future. For example, there may be a GO intent value associated with each device. In such a case, the device with the higher GO intent value may become the GO. In case of a tie of GO intent value, other criteria may be used to determine the GO.

Thereafter, the client will commence a mutual authentication procedure with the GO (306). This authentication occurs in a manner similar to the manner that an 802.11 station (STA) would use to authenticate with an 802.11 access point (AP). The purpose of the authentication process is for each device to confirm that the other device is an authorized member of the network. Various types of credentials may be used as part of the authentication process. For example, authorized devices may have a certificate issued by a common Certificate Authority (CA). In a use case involving a private network that is accessible only by first responders, the CA may issue certificates to all devices owned by the first responders. Thereafter, if a device becomes compromised (e.g., the device is lost or stolen), the CA may revoke the certificate to that device so that the compromised device would no longer be authorized.

The certificate may be either user-specific or device-specific or both. In one embodiment, the certificate may include the user's global identifier at the application layer and the device's link identifier at D2D link layer. While many different user global identifiers may be used, in one embodiment, the certificate includes the Session Initiation Protocol (SIP) Uniform Resource Identifier (URI) of the user. While many different link identifiers may be used for the device, in one embodiment, the certificate includes the media access control (MAC) address of the device. As part of the certificate-based 802.1x authentication procedure, a common Pairwise Master Key (PMK1) is derived. The authentication procedure may use one of a variety of different methods. In one embodiment, extensible authentication protocol transport layer security (EAP-TLS) may be used to generate the PMK1. PMK1 may be subsequently used for confidentiality and integrity protection of data frames for the duration of the session. In the alternative, another pairwise master key may be generated during the session. Referring again to FIG. 2, PMK1 is shown being shared between device 202 and device 204 at link 215.

At the application layer, the SIP signaling is also protected. This may occur through the use of another Pairwise Master Key (PMK2) that may be derived from PMK1. The derivation may be done with a Key Derivation Function (KDF). Examples of KDFs include password-based key derivation function (PBKDF2) and scrypt. The reason for using an SIP-based P2P client when out of coverage is that the communication may also be SIP-based when established via the network infrastructure (e.g., reusing the IP Multimedia Subsystem defined by 3GPP). In addition, SIP URIs can be used as global user identifiers for both use cases (both in and out of coverage). Referring again to FIG. 2, PMK2 is shown being shared between device 202 and device 204 at link 225.

Referring back to FIG. 1B, it is shown how multicast frames are transmitted within a P2P Group in WiFi Direct. Present within P2P group 150 are a device 152, a device 154, and a device 156. In FIG. 1B, device 154 has been assigned the role of the P2P GO and both device 152 and device 156 serve as P2P clients.

Device 152 sends a multicast frame (i.e., a frame whose destination address is a multicast MAC address) as a unicast frame to the P2P GO (device 154). This frame is protected with pairwise transient keys (PTKs) generated from a pairwise master key (PMK3) that is shared between device 152 and device 154.

Device 154 then re-transmits the frame as a multicast frame that may be received and deciphered by all members of the P2P group, including device 156 and any other devices that may exist in the network but are not illustrated in FIG. 1B. This frame is protected with group temporal keys (GTKs) that are generated from the Group Master Key (GMK) that is typically generated by the P2P GO and distributed to all P2P group members.

Figure 4:
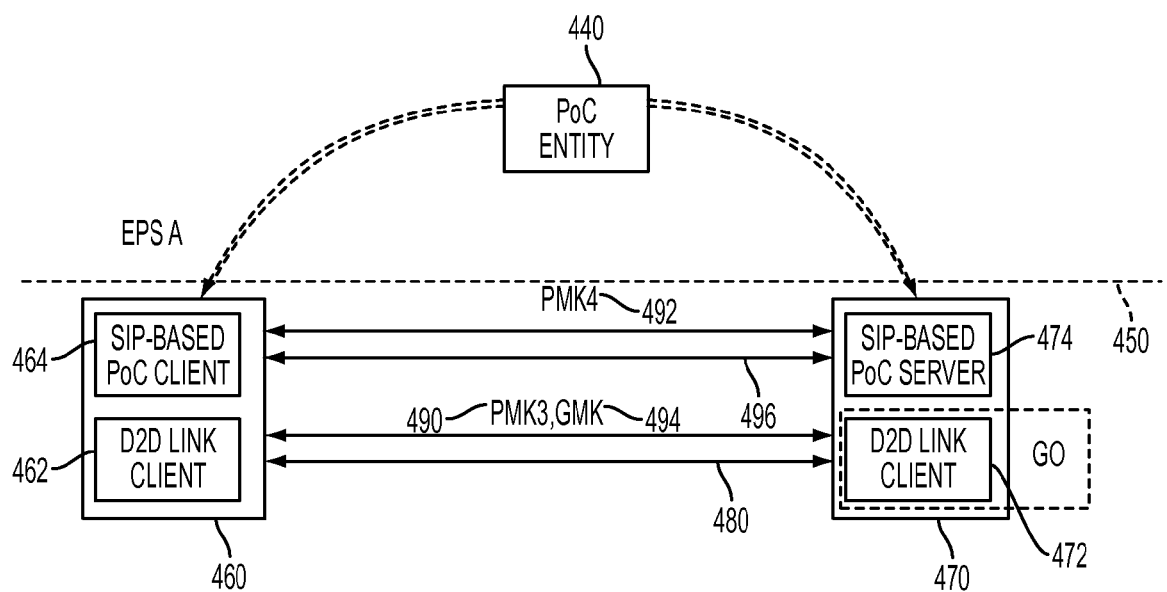
FIG. 4 presents an exemplary system architecture for group communication.

With reference to FIG. 4, an exemplary system architecture for use in ProSe group communication is presented. While ProSe group communications typically involves more than two devices in direct communication with each other, only two such devices are shown in FIG. 4. It should be understood that additional devices may be connected, but are not shown to avoid cluttering FIG. 4. The portion below dotted line 450 refers to ProSe group communications in the absence of network coverage. The portion above dotted line 450 refers to ProSe group communications in the presence of network coverage and will be described in further detail below, after the discussion of FIG. 5.

In FIG. 4, a connection between a device 460 and a device 470 is shown. Device 470 is the P2P GO, while device 460 is a P2P client. A D2D link 480 is realized as a WiFi Direct link. D2D link 480 couples together D2D link client 462, running on device 460, with D2D link client 472, running on device 470. An Open Mobile Alliance (OMA) Push to Talk over Cellular (PoC)-based client 464 is used at the application layer to establish and release P2P voice and data sessions in the devices that take the role of P2P Client. OMA PoC-based Server software 474 is used in the device that takes the role of P2P GO (device 470). This ☐ OMA PoC Server software hosts the functionality of an OMA PoC Controlling Function and OMA PoC Participating function, as defined in the OMA PoC version 2.1 specification. PoC client 464 and PoC server 474 communicate with each other via PoC connection 496.

At the application layer, it is assumed that each client is a member of an OMA PoC Group session that is identified via an OMA PoC Group session identifier (e.g., a SIP URI). At the D2D link layer, the OMA PoC Group session is given a special D2D Group identifier. In the case of WiFi Direct, this D2D Group identifier may be the multicast address that is used for distribution of data frames belonging to this OMA PoC Group.

SIP messages between the OMA PoC Client and the OMA PoC Server may be protected, if necessary, with a Pairwise Master Key (PMK4) 492 that can be derived from PMK3 490.

In order to establish the trust relationship on the D2D link, the P2P group members are in possession of certain parameters. For example, the P2P GO may be in possession of the D2D link layer identifiers of all active multicast group participants. In addition, the P2P GO may be in possession, for each member, of a Pairwise Master Key (PMK3) that is shared with that group member. Similarly, all P2P clients within the P2P group may be in possession of the D2D link layer identifier of the P2P GO and its corresponding PMK3. All devices in the group (both the P2P GO and the P2P clients) may be in possession of the D2D link layer identifier of the multicast PoC channel (referred to here as the D2D_ID Group) used by the Participating PoC function in the P2P Group Owner for distribution of data frames to all OMA PoC Group members. In addition, all devices in the group may also be in possession of the group master key (GMK) 494 that was used to generate group temporal keys (GTKs) for protection of the multicast D2D channel. The devices may be able at any time to autonomously derive the current GTK. This may be performed in a variety of different manners, such as based on a timestamp. This may be used so that devices in the group can decrypt D2D frames even before being discovered by the P2P GO.

All this information could be configured in the individual devices. However, such a solution might not scale well. A certificate-based authentication system may be more scalable. In certificate-based authentication, the certificate may be both user-specific and device-specific and include the following parameters: 1) the user's global identifier at the application layer (e.g., SIP URI); 2) the device's link identifier at D2D layer (e.g., globally administered MAC address of the WLAN "sub-device" within the device and/or a similar unmodifiable hardware identifier); 3) the pre-arranged PoC Group session identifier (SIP URI) to which the user belongs (optional); 4) the corresponding D2D multicast channel identifier (D2D_ID Group=multicast MAC address); and 5) the group master key (GMK) used for protection of the multicast D2D channel. ☐

Figure 5:
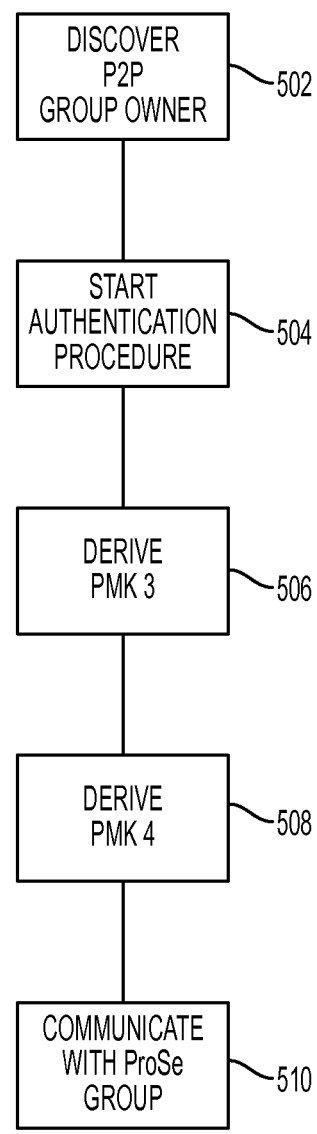
FIG. 5 presents a flowchart of the operation of an embodiment for group communication.

With reference to FIG. 5, a flowchart illustrating the overall establishment of ProSe Group communication is presented. For purposes of FIG. 5, it should be assumed that there is already one P2P Group Owner within the ProSe group. The manner in which the P2P Group Owner was ☐ established may occur in one of a variety of different manners, both now known or developed in the future.

The P2P client discovers the P2P GO (502). Subsequent to the discovery of the P2P GO discovery by a P2P Client, the P2P Client triggers a certificate-based 802.1X ☐ authentication procedure (504). This may occur in one of a variety of different manners, both now known (such as via EAP-TLS) or developed in the future. During the authentication procedure, a Pairwise Master Key (PMK3) is derived (506). Thereafter, a Pairwise Master Key (PMK4) is derived from PMK3. (508). As described above, PMK4 is used to encrypt SIP signaling messages between the OMA PoC Client and the OMA PoC Server.

During the certificate-based authentication, the P2P Client asserts its D2D link layer identity (D2D ID) and its application-layer identity (such as a SIP URI), as well as the fact that it belongs to the OMA PoC Group session that is identified with both a SIP URI and a D2D multicast channel identifier (multicast MAC address) at the application layer and the D2D link layer, respectively.

During the certificate-based authentication, the P2P Client also asserts the knowledge of the group master key (GMK) that will be used to generate group temporary keys (GTK) for protection of the multicast D2D channel. At any point in time, the P2P group members can autonomously derive the currently valid GTK from the GMK algorithmically (e.g., using the current time of the day). After PMK3 and PMK4 have been derived, the device can commence sending and receiving signals within the ProSe Group (510).

The portion of FIG. 4 that includes above dotted line 450 is an example of a system architecture for ProSe Group communication for Public Safety, when a D2D communication link is established under network coverage. Below dotted line 450 is the use case when no network coverage is available, described in detail above. In contrast to the out-of-coverage case below dotted line 450, above the dotted line 450, the devices are capable of communicating with each other (both signaling and user data) over the network infrastructure. Such communications use on OMA PoC architecture. Devices 460 and 470 are each able to communicate to OMA PoC server 440.

Suppose that the devices belonging to the same OMA PoC Group have established an OMA PoC Group session with a central OMA PoC Server 440. At some point, a group member and/or the network may decide that all group members are in proximity and should be able to communicate with the other group members over a D2D communication link. In a WiFi Direct embodiment, one of the group members becomes a P2P GO. The other group members take on the role of a P2P Client and individually establish a secure D2D link with the P2P GO in one of the following ways.

In one method, each P2P Client performs certificate-based authentication with the P2P Group Owner as described above with reference to FIG. 5. In other words, the same mechanism for secure D2D link establishment may be used regardless whether the devices are in network coverage or out of network coverage.

In the alternative, a centralized entity in the network (such as PoC entity 440) distributes the information (detailed further below) to each device in the network. The distributed information allows each P2P Client to establish a secure link with the P2P GO. For this option, the information distributed by the network consists of several parameters. The P2P Group Owner receives the D2D link layer identifiers of all active multicast group participants (D2D_ID (A) in FIG. 4). In addition, for each group member, the P2P GO receives a Pairwise Master Key (PMK3 (A)) that is shared with that group member. The P2P clients receive the D2D link layer identifier of the P2P Group Owner (D2D_ID (GO) in FIG. 4) and its corresponding PMK3 (PMK3 (A) in FIG. 4).

Each of the devices (i.e., both the P2P Group Owner and the P2P Clients) receives the D2D link layer identifier of the multicast PoC channel (D2D_ID Group in FIG. 4) used by the participating PoC function in the P2P Group Owner for distribution of data frames to all OMA PoC Group members. In addition, each of the devices receives the GMK—the group master key used to generate group temporal keys (GTKs) for protection of the multicast D2D channel. As described above, the devices s should be able at any time to autonomously derive the current GTK in one of a variety of different methods. For example, the current GTK might be able to be derived based on a timestamp.

The network solution for 1:1 ProSe communication establishment under network coverage (not illustrated) is even simpler—in order to assist the establishment of a secure D2D link, the network assistance information provided to either device includes the D2D_ID of the device to which connection is desired, as well as the pairwise master key (PMK1). This information may be provided via SIP or via a variety of other different entities, both those that exist now and those that may exist in the future.

Transitions Between In-Coverage and Out-of-Coverage

Regardless of how the D2D communication link was established under network coverage, devices in either a 1:1 or a group communications can keep using the same pairwise master key even when they move out of network coverage. Similarly, for a D2D link that was established out-of-coverage using certificate-based authentication, if the devices return under network coverage with established communication, they can keep using the same pairwise master key.

However, if the validity of the current pairwise master key expires after the devices have left the original context (i.e., when a device leaves network coverage, then enters network coverage again) there will need to fall back to the option(s) for key renewal that is are valid for their current environment. An exemplary situation is that a device becomes compromised during a period of no network coverage. The person who uses the device reports this fact to the Certificate Authority, which revokes the certificate for the device. However, until the other devices enter network coverage, they might not become aware of the revoked certificate. Thus, it may be desirable to check the certificate as soon as a device re-enters network coverage.

Applicability to Other D2D Technologies

The D2D link based on the WiFi Direct technology (that was used so far as a basis for description of the present proposal) is intrinsically asymmetric, in that it designates a special "privileged device," i.e., the device that takes on the role of the P2P GO.

In reference to the 1:1 ProSe communication architecture depicted in FIG. 2, this designation of a privileged device (the GO) is specific to WiFi Direct operation; an embodiment that does not use WiFi Direct for the D2D technology may or may not have such a privileged device. Whatever the alternative D2D technology, such a technology will likely also rely on D2D link layer identifiers (similar to the MAC addresses in WiFi Direct) and a pre-shared secret in order to secure the D2D link. As a consequence, both a certificate-based solution and a network-assisted solution still apply.

In reference to the ProSe Group communication architecture depicted in FIG. 4, the privileged device (i.e., the P2P Group Owner) has additional privileged functionalities at the upper layers, such as the OMA PoC Server functionality. We expect that any alternative D2D technology supporting ProSe Group communication will need to rely on a similar privileged device, in which case the solutions for ProSe Group communication described previously would still apply.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 6:
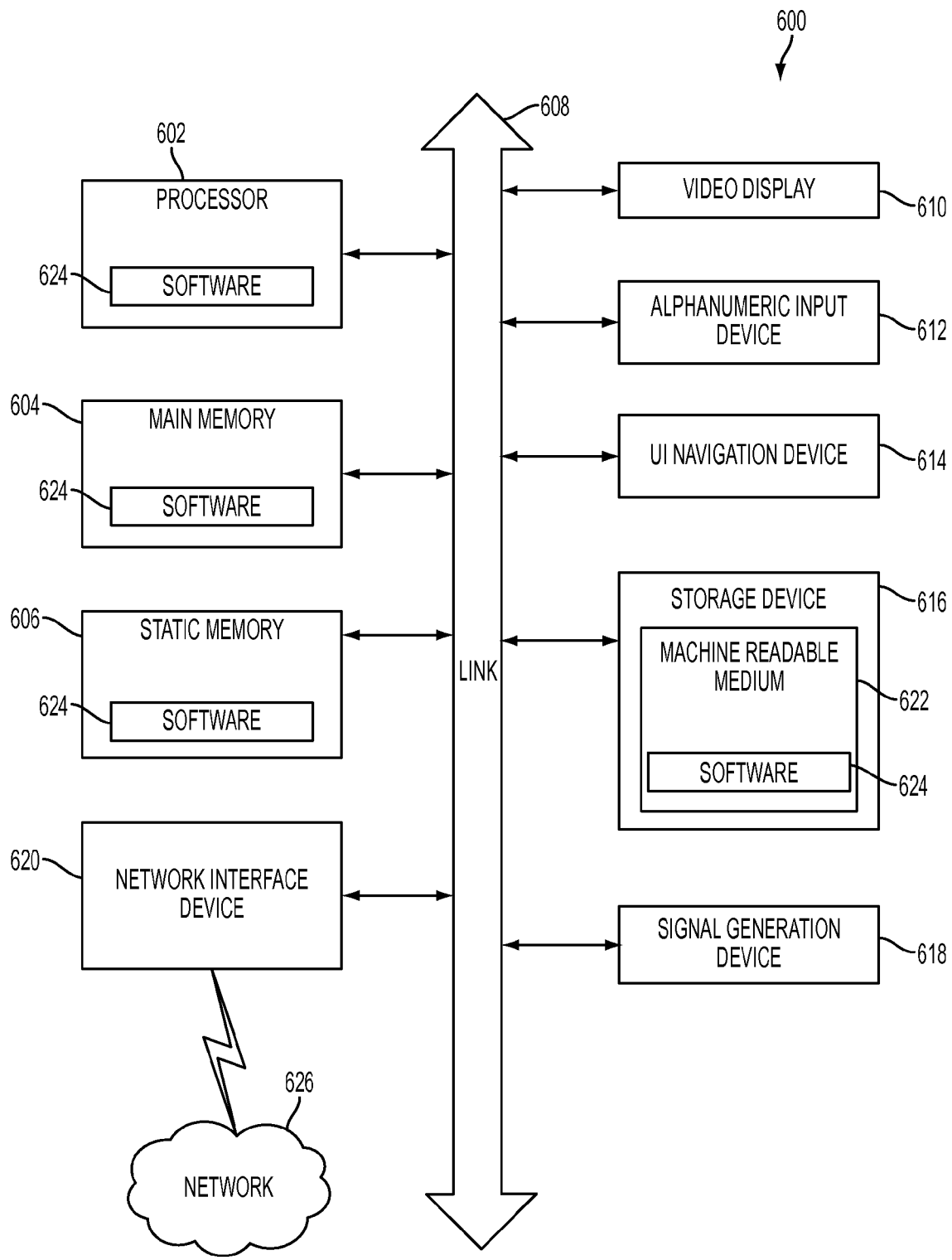
FIG. 6 is a block diagram illustrating an example machine that is capable of executing an embodiment.

FIG. 6 is a block diagram illustrating an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a Personal Digital Assistant (PDA), a smartphone, a web appliance, a network router, switch or bridge, a dedicated navigation device, laptop computers, a television, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, and a static memory 606, some or all of which may communicate with each other via an interlink (e.g., bus) 608. The machine 600 may further include a display device 610, an alphanumeric input device 612 (e.g., a keyboard), and a user interface (UI) navigation device 614 (e.g., a mouse or track pad). In an example, the display device 610, input device 612 and UI navigation device 614 may be a touch screen display that accomplishes all three tasks. The machine 600 may additionally include a mass storage device (e.g., flash memory) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), Bluetooth, or near-field communication) connection to communicate or control one or more peripheral devices (e.g., a printer, card reader, etc.).

The mass storage device 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine-readable media.

While the machine-readable medium 622 is illustrated as a single medium, the term "machine-readable medium" may include a single medium or multiple media (e.g., a centralized or distributed database, and/or associated caches and servers) that is arranged to store the one or more instructions 624.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM, DVD-ROM, and Blu-Ray disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The following examples pertain to further embodiments.

Example 1 includes a method for coupling a first mobile device with a second mobile device in a 1:1 Proximity-based Services (ProSe) communication session comprising: the first mobile device discovering the presence of the second mobile device; negotiating between the first mobile device and the second mobile device to determine which of the first mobile device and the second mobile device is to become a group owner of the communication session and which is to become a client of the communication session; and wherein when the first mobile device is the client, the method includes conducting a mutual authentication with the group owner; when the first mobile device is the group owner, the method includes receiving authentication information from the client; and the connection between the first mobile device and the second mobile device is via a device-to-device (D2D) link.

In example 2, the subject matter of example 1 may optionally include wherein conducting mutual authentication comprises: generating a pairwise master key; and wherein the method further comprises: using the pairwise master key to protect transmissions between the first mobile device and the second mobile device that travel via the D2D link.

In example 3, the subject matter of example 1 may optionally further comprise: establishing an application-layer communication session between the first mobile device and the second mobile device.

In example 4, the subject matter of example 3 may optionally further comprise: generating a pairwise master key; and wherein the method further comprises: using the pairwise master key to protect transmissions between the first mobile device and the second mobile device that travel via the communication session.

In example 5, the subject matter of example 1 may optionally further comprise conducting mutual authentication further comprising: the second device verifying a first certificate owned by the first device; and the first device verifying a second certificate owned by the second device; wherein, the first certificate includes a first link identifier that identifies the first device; the second certificate includes a second link identifier that identifies the second device; the first certificate is arranged to confirm that the first device is authorized; and the second certificate is arranged to confirm that the second device is authorized.

In example 6, the subject matter of example 5 may optionally include the additional feature wherein: the first link identifier comprises a media access control (MAC) address of the first device; and the second link identifier comprises a MAC address of the second device.

In example 7, the subject matter of example 5 may optionally include wherein: the first certificate further includes a global identifier belonging to a user of the first device; the second certificate further includes a global identifier belonging to a user of the second device.

In example 8, the subject matter of example 1 may optionally include wherein the D2D link is a WiFi Direct connection.

In example 9, the subject matter of example 1 may optionally include wherein the D2D link is an LTE Direct connection.

In example 10, the subject matter of example 1 may optionally include wherein the first mobile device is arranged to communicate to the second mobile device in the absence of coverage from a network.

Example 11 is a method for coupling a first mobile device with a second mobile device in a Proximity-based Services (ProSe) group communication session comprising: the first mobile device discovering the presence of the second mobile device; negotiating between the first mobile device and the second mobile device to determine which of the first mobile device and the second mobile device is to become a group owner of the communication session and which is to become a client of the communication session; initiating a certificate-based authentication procedure; establishing a device-to-device connection between the first mobile device and the second mobile device; and establishing a Push to Talk over Cellular (PoC) connection between the first mobile device and the second mobile device.

In example 12, the subject matter of example 11 may optionally include wherein initiating a certificate-based authentication procedure comprises: having both the first mobile device and the second mobile device assert a D2D link layer identity and an application layer identity; having the first mobile device assert its belonging to a group by providing an application layer identity belonging to the group and a link layer identity belonging to the group; having the first mobile device assert its knowledge of a group master key; deriving a group temporary key from the group master key; and using the group temporary key to protect multicast frames the first mobile device sends over the PoC connection.

In example 13, the subject matter of example 11 may optionally include wherein the first mobile device is able to communicate with the second mobile device in the absence of coverage from a network.

In example 14, the subject matter of example 11 may optionally include the group owner receiving a unicast frame from the client of the communication session; and having the group owner re-transmit the unicast frame as a multicast frame.

In example 15, the subject matter of example 11 may optionally include transmitting data to a PoC server when a network connection is available; and receiving data from a PoC server when a network connection is available.

In example 16, the subject matter of example 15 may optionally include wherein initiating a certificate-based authentication procedure comprises: having the group owner receive a D2D link identifier for a client that is to be part of the group communication session; having the group owner receive a pairwise master key that is shared with the second mobile device; and using the pairwise master key to transmit and receive data to and from the second mobile device.

In example 17, the subject matter of example 15 may optionally include wherein initiating a certificate-based authentication procedure comprises: having the client receive a D2D link identifier for the group owner; having the client receive a pairwise master key that is shared with the group owner; and using the pairwise master key to transmit and receive data with the group owner.

In example 18, the subject matter of examples 16 or 17 may optionally include: receiving a D2D link identifier for the PoC connection.

Example 19 is a mobile device for communicating in a Proximity-based Services (ProSe) 1:1 communication session comprising: a processor; a transceiver coupled to the processor and arranged to transmit and receive signals via an antenna assembly; wherein the processor is arranged to: discover the presence of a second mobile device; negotiate with the second mobile device to determine which of the mobile device and the second mobile device is to become a group owner of the communication session and which is to become a client of the communication session; and conduct a mutual authentication with the group owner, when the mobile device is a client of the communication session; wherein, the connection between the first mobile device and the second mobile device is via a device-to-device (D2D) link.

In example 20, the subject matter of example 19 may optionally include wherein the mobile device is a user equipment (UE) arranged to transmit and receive signals via 3rd Generation Partnership Project Long Term Evolution (3GPP-LTE) signaling.

In example 21, the subject matter of example 19 may optionally include wherein the D2D link is via a WiFi Direct connection.

In example 22, the subject matter of example 19 may optionally include wherein the D2D link is via a LTE Direct connection.

Example 23 is a machine-readable medium including instructions for coupling a first mobile device with a second mobile device in a Proximity-based Services (ProSe) 1:1 communication session, which when executed by a first computing device, cause the first computing device to: discover the presence of a second computing device; negotiate between with the second computing device to determine which of the first computing device and the second computing device is to become a group owner of the communication session and which is to become a client of the communication session; and wherein when the first computing device is the client, initiate a mutual authentication with the second computing device; when the first mobile device is the group owner, the instruction cause the first computing device to receive mutual authentication information from the second computing device; and the connection between the first mobile device and the second mobile device is via a device-to-device (D2D) link.

In example 24, the subject matter of example 23 may optionally include wherein the medium further comprises instructions which, when executed, cause the first computing device to: establishing a communication session between the first computing device and the second computing device.

In example 25, the subject matter of example 24 may optionally include wherein the medium further comprises instructions which, when executed, cause the first computing device to: generate a pairwise master key; and use the pairwise master key to protect transmissions between the first computing device and the second computing device that travel via the D2D link.

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

We claim:

1. A method for coupling a first mobile device with a second mobile device in a one-to-one Proximity-based Services (ProSe) communication session comprising:

the first mobile device discovering the presence of the second mobile device;

negotiating between the first mobile device and the second mobile device to determine which of the first mobile device and the second mobile device is to become a group owner of the communication session and which is to become a client of the communication session; and wherein when the first mobile device is the client, the method includes conducting a mutual authentication with the group owner;

when the first mobile device is the group owner, the method includes receiving authentication information from the client; and the connection between the first mobile device and the second mobile device is via a device-to-device (D2D) link, wherein conducting mutual authentication comprises:

transmitting a first certificate owned by the first mobile device to the second mobile device to permit the second mobile device to verify the first certificate; and the first mobile device verifying a second certificate owned by the second mobile device; and wherein:

the first certificate includes a first link identifier that identifies the first mobile device;

the second certificate includes a second link identifier that identifies the second mobile device;

the first certificate is arranged to confirm that the first mobile device is authorized; and the second certificate is arranged to confirm that the second mobile device is authorized.

2. The method of claim 1 wherein conducting mutual authentication comprises:
generating a pairwise master key; and
wherein the method further comprises:
using the pairwise master key to protect transmissions between the first mobile device and the second mobile device that travel via the D2D link.

3. The method of claim 1 further comprising:
establishing an application-layer communication session between the first mobile device and the second mobile device.

4. The method of claim 3 further comprising:
generating a pairwise master key; and
wherein the method further comprises:
using the pairwise master key to protect transmissions between the first mobile device and the second mobile device that travel via the communication session.

5. The method of claim 1 wherein:
the first link identifier comprises a media access control (MAC) address of the first mobile device; and
the second link identifier comprises a MAC address of the second mobile device.

6. The method of claim 1 wherein:
the first certificate further includes a global identifier belonging to a user of the first mobile device;
the second certificate further includes a global identifier belonging to a user of the second mobile device.

7. The method of claim 1 wherein the D2D link is a WiFi Direct connection.

8. The method of claim 1 wherein the D2D link is an LTE Direct connection.

9. The method of claim 1 wherein the first mobile device is arranged to communicate to the second mobile device in the absence of coverage from a network.

10. A method for coupling a first mobile device with a second mobile device in a Proximity-based Services (ProSe) group communication session comprising:
the first mobile device discovering the presence of the second mobile device;
negotiating between the first mobile device and the second mobile device to determine which of the first mobile device and the second mobile device is to become a group owner of the communication session and which is to become a client of the communication session;
initiating a certificate-based authentication procedure;
establishing a device-to-device connection between the first mobile device and the second mobile device; and
establishing a Push to Talk over Cellular (PoC) connection between the first mobile device and the second mobile device,
wherein initiating a certificate-based authentication procedure comprises one of:
a) the first mobile device asserting a D2D link layer identity and an application layer identity and receiving from the second mobile device an assertion of the D2D link layer identity and application layer identity;
having the first mobile device assert its belonging to a group by providing an application layer identity belonging to the group and a link layer identity belonging to the group;
having the first mobile device assert its knowledge of a group master key;
deriving a group temporary key from the group master key; and
using the group temporary key to protect multicast frames the first mobile device sends over the PoC connection,
b) having the group owner receive a D2D link identifier for the client;
having the group owner receive a pairwise master key that is shared with the client; and
using the pairwise master key to transmit and receive data to and from the client, and
c) having the client receive a D2D link identifier for the group owner;
having the client receive a pairwise master key that is shared with the group owner; and
using the pairwise master key to transmit and receive data with the group owner.

11. The method of claim 10 wherein initiating a certificate-based authentication procedure comprises:
having the first mobile device assert a D2D link layer identity and an application layer identity and receiving from the second mobile device an assertion of the D2D link layer identity and application layer identity;
having the first mobile device assert its belonging to a group by providing an application layer identity belonging to the group and a link layer identity belonging to the group;
having the first mobile device assert its knowledge of a group master key;
deriving a group temporary key from the group master key; and
using the group temporary key to protect multicast frames the first mobile device sends over the PoC connection.

12. The method of claim 10 wherein the first mobile device is able to communicate with the second mobile device in the absence of coverage from a network.

13. The method of claim 10 further comprising:
the group owner receiving a unicast frame from the client of the communication session; and
having the group owner re-transmit the unicast frame as a multicast frame.

14. The method of claim 10 further comprising:
transmitting data to a PoC server when a network connection is available; and
receiving data from a PoC server when a network connection is available.

15. The method of claim 10 wherein initiating a certificate-based authentication procedure comprises:
having the group owner receive a D2D link identifier for the client;
having the group owner receive a pairwise master key that is shared with the client; and
using the pairwise master key to transmit and receive data to and from the client.

16. The method of claim 10 wherein initiating a certificate-based authentication procedure comprises:
having the client receive a D2D link identifier for the group owner;
having the client receive a pairwise master key that is shared with the group owner; and
using the pairwise master key to transmit and receive data with the group owner.

17. The method of one of claim 15 or 16 further comprising:
receiving a D2D link identifier for the PoC connection.

18. A mobile device for communicating in a Proximity-based Services (ProSe) one-to-one communication session comprising:
a processor;
a transceiver coupled to the processor and arranged to transmit and receive signals via an antenna assembly; wherein the processor is arranged to:
    discover the presence of a second mobile device;
    negotiate with the second mobile device to determine which of the mobile device and the second mobile device is to become a group owner of the communication session and which is to become a client of the communication session; and
    conduct a mutual authentication with the group owner, when the mobile device is a client of the communication session; wherein,
the connection between the first mobile device and the second mobile device is via a device-to-device (D2D) link,
to conduct mutual authentication the processor is arranged to:
    cause the transceiver to transmit a first certificate owned by the mobile device to the second mobile device to permit the second mobile device to verify the first certificate; and
    verify a second certificate owned by the second mobile device; and
    wherein:
        the first certificate includes a first link identifier that identifies the mobile device;
        the second certificate includes a second link identifier that identifies the second mobile device;
        the first certificate is arranged to confirm that the mobile device is authorized; and
        the second certificate is arranged to confirm that the second mobile device is authorized.

19. The mobile device of claim 18 wherein the mobile device is a user equipment (UE) arranged to transmit and receive signals via 3rd Generation Partnership Project Long Term Evolution (3GPP-LTE) signaling.

20. The mobile device of claim 18 wherein the D2D link is via a WiFi Direct connection.

21. The mobile device of claim 18 wherein the D2D link is via a LTE Direct connection.

22. A non-transitory machine-readable medium including instructions for coupling a first computing device with a computing mobile device in a Proximity-based Services (ProSe) one-to-one communication session, which when executed by the first computing device, cause the first computing device to:
    discover the presence of a second computing device;
    negotiate between with the second computing device to determine which of the first computing device and the second computing device is to become a group owner of the communication session and which is to become a client of the communication session; and
    wherein when the first computing device is the client, initiate a mutual authentication with the second computing device;
    when the first computing device is the group owner, the instructions cause the first computing device to receive mutual authentication information from the second computing device; and
the connection between the first computing device and the second computing device is via a device-to-device (D2D) link,
wherein the instructions to initiate mutual authentication with the second computing device comprise instructions to:
    transmit a first certificate owned by the first computing device to the second computing device to permit the second computing device to verify the first certificate; and
    verify a second certificate owned by the second computing device;
    wherein:
        the first certificate includes a first link identifier that identifies the first computing device;
        the second certificate includes a second link identifier that identifies the second computing device;
        the first certificate is arranged to confirm that the first computing device is authorized; and
        the second certificate is arranged to confirm that the second computing device is authorized.

23. The non-transitory machine-readable medium of claim 22 wherein the medium further comprises instructions which, when executed, cause the first computing device to:
    establishing a communication session between the first computing device and the second computing device.

24. The non-transitory machine-readable medium of claim 23 wherein the medium further comprises instructions which, when executed, cause the first computing device to:
    generate a pairwise master key; and
    use the pairwise master key to protect transmissions between the first computing device and the second computing device that travel via the D2D link.

* * * * *